United States Patent [19]

Brown

[11] Patent Number: 4,951,605
[45] Date of Patent: Aug. 28, 1990

[54] LITTER DISPOSAL SYSTEM

[76] Inventor: Frank Brown, 8 Tyson Shepway, North York, Ontario, Canada, M2J 4R9

[21] Appl. No.: 189,944

[22] Filed: May 3, 1988

[51] Int. Cl.⁵ ............................................. A01K 29/00
[52] U.S. Cl. ....................................................... 119/1
[58] Field of Search ................ 119/1, 17, 19; 220/401

[56] References Cited

U.S. PATENT DOCUMENTS

| | | | |
|---|---|---|---|
| 2,007,997 | 7/1935 | Beulke et al. | 220/401 |
| 2,010,789 | 8/1935 | Roesel | 220/401 X |
| 2,952,381 | 9/1960 | Rosner | 220/401 X |
| 2,970,628 | 2/1961 | Tames | 220/401 X |
| 3,132,794 | 5/1964 | Frazier | 220/401 X |
| 3,281,178 | 10/1966 | Fisher | 119/1 X |
| 3,352,520 | 11/1967 | Bumgarner et al. | 220/401 X |
| 3,786,780 | 1/1974 | Pezzino | 119/1 X |
| 4,180,113 | 12/1979 | Liebling | 220/401 X |
| 4,646,802 | 3/1987 | Basore et al. | 220/401 |
| 4,819,580 | 4/1989 | Foldes | 119/1 |

Primary Examiner—Gene Mancene
Assistant Examiner—R. Thomas Price
Attorney, Agent, or Firm—Ridout & Maybee

[57] ABSTRACT

A litter disposal system comprises a receptacle, including a bag and a tray, and a support structure for supporting the bag in a suspended position. The bag is formed with opposed flap portions adapted to be engaged to securing pegs depending from a top frame of the support structure, and the bottom frame of the support structure includes members for supporting and retaining the tray. After use by the house pet, the receptacle may be conveniently tied, removed from the support structure and discarded, and replaced by a replacement receptacle conveniently contained in kit form.

10 Claims, 5 Drawing Sheets

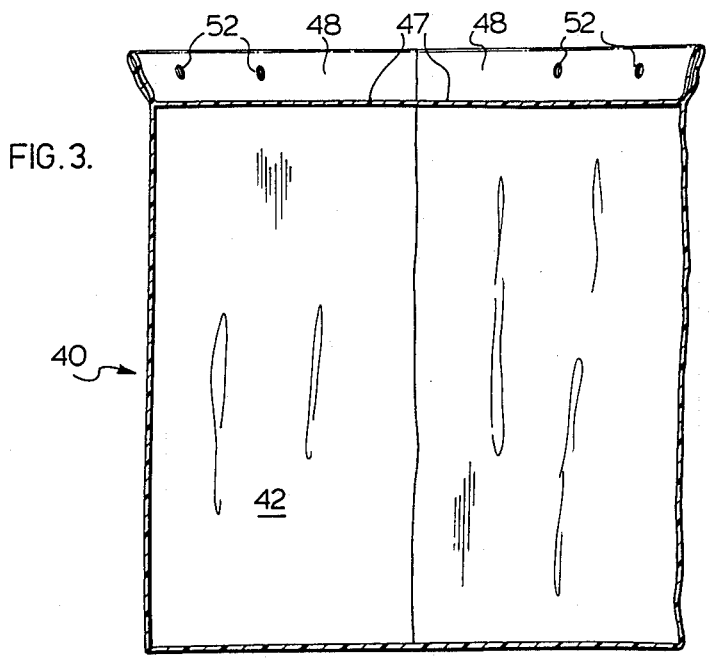
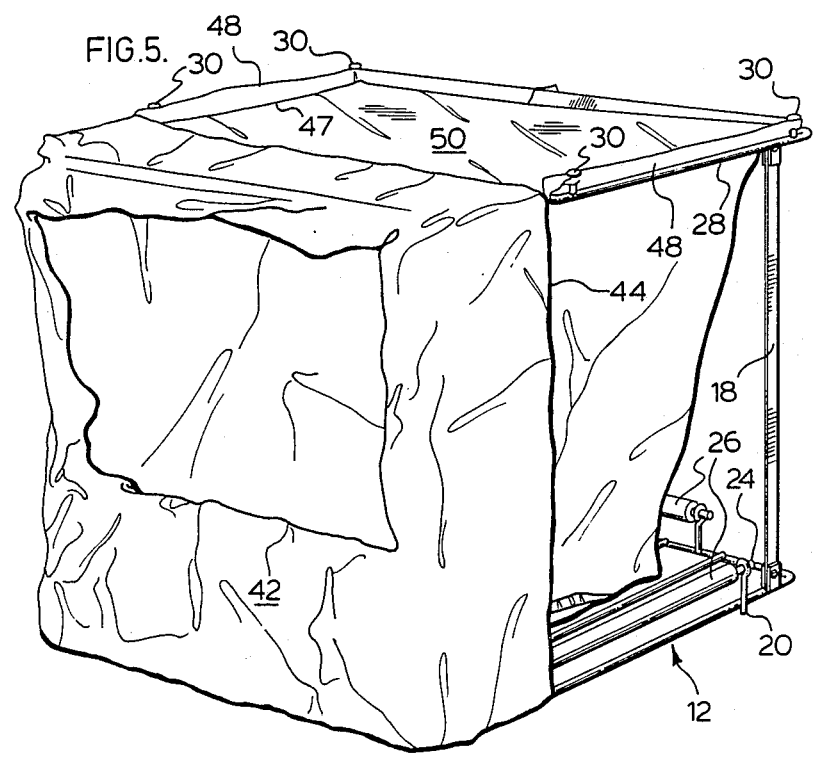

4,951,605

LITTER DISPOSAL SYSTEM

FIELD OF THE INVENTION

The present invention relates to a receptacle for deposition, containment and disposal of the excrement of house pets.

In particular, the present invention provides a disposable receptacle and a support structure therefor for the deposition, containment and disposal of the excrement of house pets.

BACKGROUND OF THE INVENTION

House pets, and particularly cats, when confined inside a dwelling for an extended period, require sanitary litter facilities for depositing and containing excrement. Such facilities are known to comprise a receptacle in the nature of a tray partially filled with pet litter absorbent material, typically a particulate clay compound.

Such receptacles pose a number of problems to the householder. The absorbent litter, while suitable for absorbing pet urine, does not typically absorb any substantial portion of the obnoxious odors produced by the excrement of house pets. These odors escape into the surrounding area and become an annoyance to the homeowner and other inhabitants of the dwelling. As well, the sight of soiled litter in a tray is distasteful to inhabitants of the dwelling.

Moreover, pets frequently instinctively attempt to bury their excrement, and in the process often end up broadcasting litter beyond the confines of the tray, where it can become entrapped in carpet fibres. Once litter has migrated into carpeting it is generally very difficult to remove, reducing the life of carpeting and often adding to the obnoxious odors tending to pervade the area of the dwelling surrounding the receptacle. Such stray litter particles can also be transported to other areas of the dwelling in the treads of shoes, increasing the difficulty of keeping the dwelling clean.

Furthermore, in order to retain such a receptacle in a sanitary condition and minimize obnoxious odors emanating therefrom, the absorbent litter must be changed regularly. This involves periodically disposing of soiled litter and replacing it with unsoiled litter, a distasteful and messy chore which involves unpleasantly close contact with pet litter soiled by animal excrement. In fact, direct handling of soiled litter poses a danger to women of contacting toxoplasmosis during pregnancy.

The receptacle itself must be cleaned with a disinfecting cleaner for maximum sanitization, otherwise a residue of soiled litter particles will adhere to the receptacle walls when the litter is changed, contaminating the fresh litter.

Additionally, most commonly used pet litter contains a very fine particulate element which, when the litter is disturbed, billows into the air, to be inhaled by the unfortunate householder charged with changing the litter before settling all over the surrounding area.

Litter receptacles are known which consist of a tray and a compatible hood therefor forming an enclosed area having an opening for the entry and exit of the pet. Such a receptacle can be more effective than an uncovered litter tray at containing obnoxious odors and stray litter particles, and assists in shielding soiled litter from view, however it tends to be more difficult and time consuming to clean, and more expensive to construct.

It is also known to provide a litter tray which is disposable, thus obviating the need for removing soiled litter from the tray, disinfecting the tray and refilling it with fresh litter. However, such receptacles are far less effective at containing odors and stray litter particles and concealing soiled litter from view, than covered receptacles.

Known covered receptacles are too costly to replace to render discarding the entire receptacle economic, and too bulky to be discarded conveniently.

The present invention overcomes these disadvantages by providing a disposable litter receptacle comprising a bag containing a tray, and a support structure for supporting the bag in a suspended position, creating a privacy area for the deposition of excrement and containment of odors and stray litter particles, and concealing soiled litter from view, with an opening for entry and exit of the pet. When the litter becomes soiled, the bag may be conveniently tied, removed and discarded together with the tray containing soiled litter contained therein, and replaced by a convenient and economic replacement receptacle contained in kit form.

The invention thus combines the advantages of a covered litter receptacle and the advantages of a disposable litter receptacle. The receptacle is easy to erect and economic, and makes disposal of soiled litter easy and sanitary.

SUMMARY OF THE INVENTION

The present invention provides a litter disposal receptacle comprising a flexible bag having a wall with opposed exterior flap portions adapted to be suspended from a support structure to support the bag in a suspended position.

The present invention also provides a litter disposal system comprising a receptacle, including a flexible bag having a wall with exterior opposed flap portions, and a support structure supporting raised securing means adapted to secure the flap portions and support the bag in an erected condition.

The present invention also provides a support structure for supporting a receptacle comprising a flexible bag, comprising a bottom frame including means for retaining a tray, a top frame including means for securing the bag, and supporting members supporting the top frame in substantially vertically spaced relation to the bottom frame.

The present invention also provides, in combination, a support structure, comprising a bottom frame including means for retaining a tray, a top frame including means for securing a bag, and supporting members supporting the top frame in substantially vertically spaced relation to the bottom frame, and a receptacle comprising a flexible bag having a wall with opposed exterior flap portions adapted to be suspended from the support structure to support the bag in a suspended position.

The present invention also provides a replacement kit for a receptacle adapted to be suspended from a support structure, comprising a flexible bag having a wall with opposed exterior flap portions and a tray adapted to be inserted into the bag and retained by the support structure.

BRIEF DESCRIPTION OF THE DRAWINGS

In drawings which illustrate by way of example only a preferred embodiment of the invention.

FIG. 3 is a cross-section of the bag of FIG. 2;

FIG. 5 is a perspective view of the bag of FIG. 2 in a suspended position supported by the support structure of FIG. 1;

DETAILED DESCRIPTION OF THE INVENTION

Figure 1:
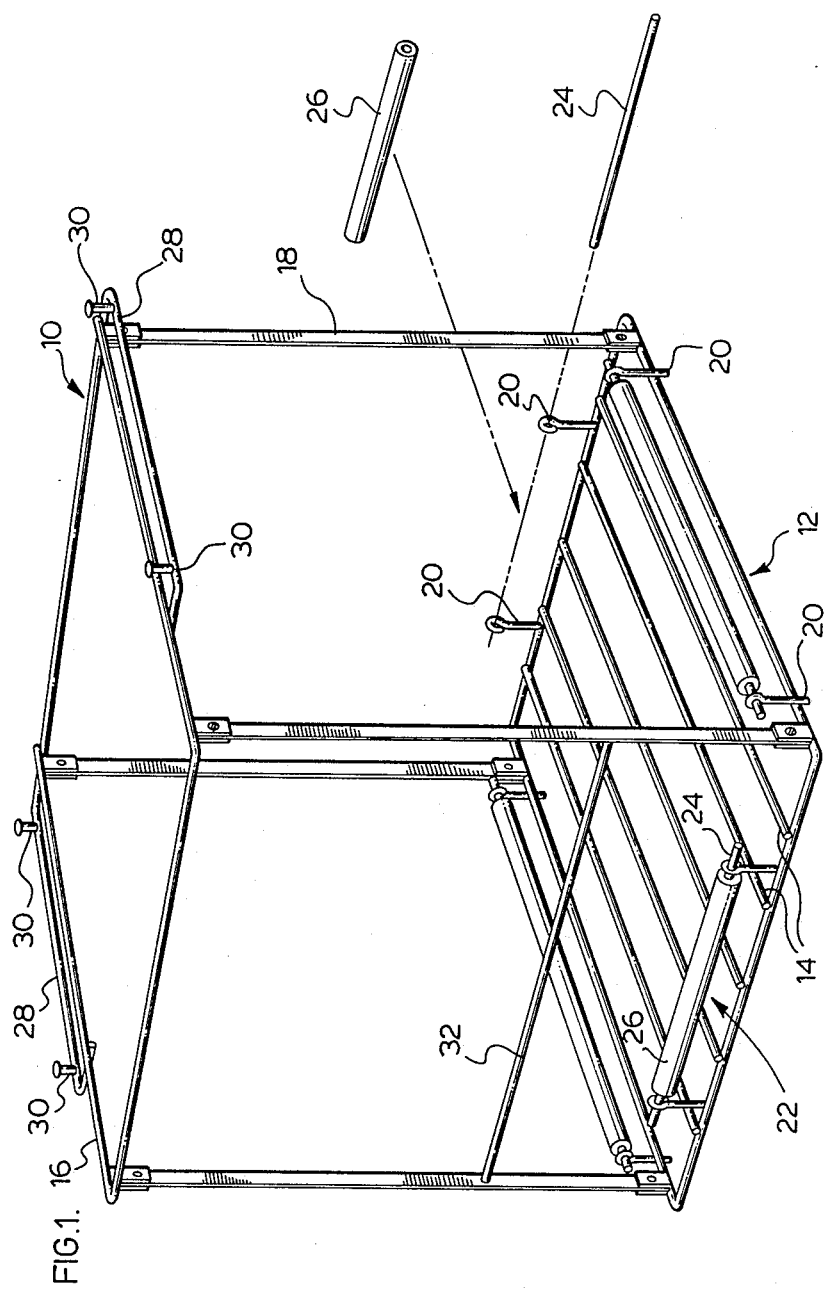
FIG. 1 is a perspective view of a support structure of the present invention.

In a preferred embodiment of the invention, as illustrated in FIG. 1, a support structure 10 having a front end and a back end includes a substantially rectangular bottom frame 12 formed from a rigid material such as metal or plastic wire, and preferably evenly spaced apart longitudinally extending cross members 14 welded or otherwise affixed to the ends of the bottom frame 12 for supporting a tray 60. A top frame 16, also formed from a rigid material such as metal or plastic wire, is supported substantially vertically above the bottom frame 12 by means of rigid supporting members 18 which are affixed generally adjacent to the corners of the top and bottom frames 12, 16.

Projecting substantially vertically from the sides and ends of the bottom frame 12 are pairs of supporting posts 20 having looped upper ends for rotatably receiving tray retaining members 22 for retaining a shallow tray 60. The supporting posts 20 are preferably inset from the corners of the bottom frame 12, and some supporting posts 20 may project below the bottom frame 12 to provide feet for the support structure 10. Tray retaining members 22 comprising rigid tray retaining rods 24 of suitable lengths are engaged with the supporting posts 20 by inserting a tray retaining rod 24 through the loops of the supporting posts 20 of each side and end of the bottom frame 12, and securing means (not shown) may be inserted over each end of the tray retaining rod 24 to prevent disengagement from the supporting posts 20.

The tray retaining members 22 preferably include a resilient sleeve 26, composed of urethane foam or another suitable material to adjust to varying sizes of the tray 60, and for other reasons described below.

A rigid bracket 28 depends outwardly from each side of the top frame 16. The brackets 28 are spaced from the front end of the support structure, for reasons which will later become apparent. Securing means 30, such as mushroom-shaped buttons or pegs, project upwardly from each bracket 28 for securing flap portions 48 of a flexible bag 40, which is described below.

Preferably, a rigid substantially horizontal member 32 extends between the supporting members 18 at the front end of the support structure 10. The horizontal member 32 should be raised from the tray retaining member 22 at the front end of the support structure and from the upper edge of the tray 60 described below, but should be low enough to enable the intended occupant of the receptacle of the present invention to traverse the opening thereof.

Figure 2:
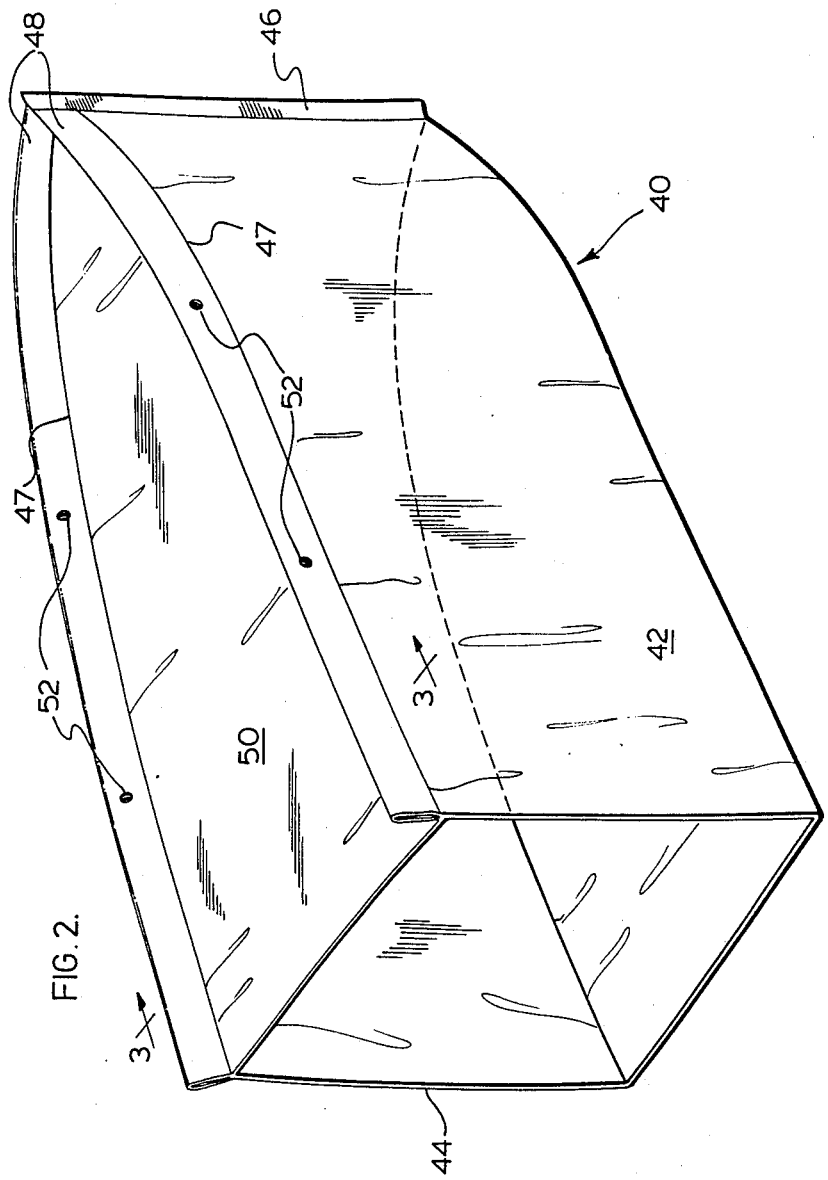
FIG. 2 is a perspective view of a flexible bag of the present invention.

A disposable receptacle comprises a flexible bag 40 and a tray 60. The flexible bag 40, having a wall 42, an open end with a lip 44 and a closed end 46, as illustrated in FIG. 2, is provided with a pair of opposed flap portions 48 adapted to be engaged to the securing means 30 of the top frame 16. The bag 40 may be composed of any suitable flexible material, such as lightweight plastic, which is disposable and therefore preferably inexpensive, and preferably opaque. The flap portions 48 are preferably formed by heat sealing seams 47 along the wall 42 of the bag to isolate the interior of the bag 40 from the flap portions 48. The seams 47 are preferably spaced apart generally in an interval equal to the side-to-side dimension of the top frame 16, the resulting wall between the seams 47 defining the top 50 of the bag 40, and the flap portions 48 must be wide enough to extend to the securing means 30 of the top frame 16.

The tray 60 comprises a bottom 62, ends 64 and sides 66 and is composed of a relatively sturdy and inexpensive material, such as corrugated cardboard as commonly used in packing cartons, adapted to contain a suitable amount of litter 68. The tray 60 may be treated to absorb odours, and may be coated with a water impervious coating to assist in maintaining its integrity after use by the house pet. The dimensions of the tray 60 should permit it to fit snugly within the tray retaining members 22, supported at the bottom by the cross members 14 of the bottom frame 12.

Figure 4:
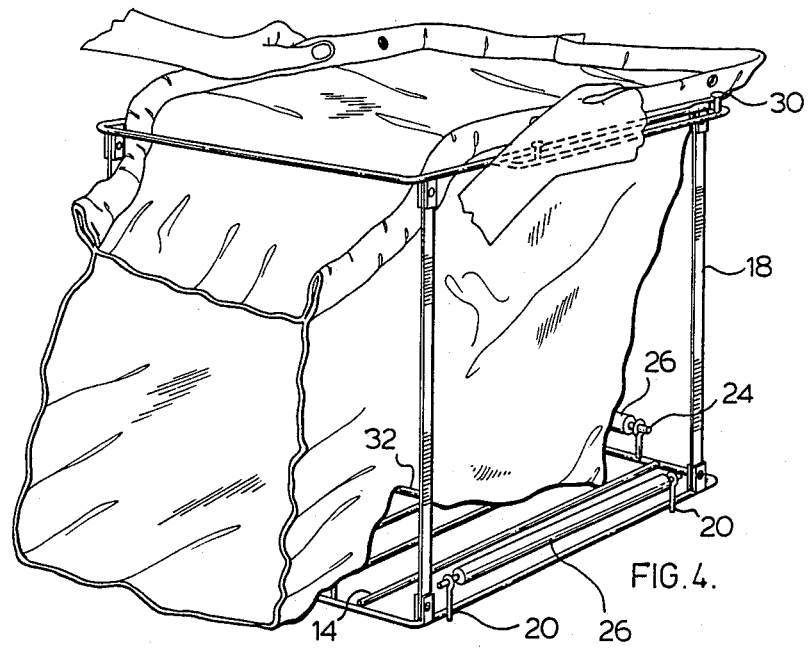
FIG. 4 is a perspective view of the bag of FIG. 2 positioned for attachment to the support structure of FIG. 1.

In use, the support structure 10 is placed in a suitable location and the flexible bag 40 may be lowered through the top frame 16 of the supporting structure, with the flap portions 48 and the top 50 of the bag held upwardly and parallel to the sides of the top frame 16, and the lip 44 of the bag adjacent to the front end of the support structure 10. The remainder of the bag wall 42 hangs generally centrally into the support structure 10, as illustrated in FIG. 4.

The flap portions 48 are pulled away from each other to stretch the top 50 of the bag 40 taught, and the flap portions 48 are secured to the securing means 30, in the embodiment illustrated, mushroom shaped buttons. A button hole 52 is preferably provided in the flap portions 48 corresponding to the locations of each of the securing means 30. The user simply draws each flap portion 48 over the sides of the top frame 16 with the button holes 52 aligned with corresponding securing means 30 and engages the flap portion 48 with the securing means 30 by inserting same through each button hole 52. The inherent resilience of the material from which the bag 40 is formed causes the flap portion 48 to engage around the stem of the securing means, particularly about the outer side thereof due to the transverse tension in the top 50 of the bag 40, and thus remain firmly seated around the stem of the securing means 30, as illustrated in FIG. 5. As illustrated in FIG. 3, each flap portion 48 preferably consists of a double layer of plastic, which assists in preventing tearing of the flap portions 48 under the force of the tension in the top 50 of the bag 40.

As illustrated in FIG. 5, the bag 40 being suspended by the attachment of the flap portions 48 to the securing means 30, the remainder of the bag 40 hangs into the support structure 10. The lip 44 around the opening of the bag 40 is drawn through the space at the front of the support structure 10 defined by the top frame 16, supporting members 18 and horizontal member 32, and is folded back around the top frame 16, supporting members 18 and bottom frame 12 at the front end of the support structure 10.

With the bag 40 properly dimensioned to the dimensions of the support structure 10, the lip 44 of the bag 40 may be folded back only as far as the brackets 28 bearing the securing means 30 without deforming or tearing the bag 40. For this reason the brackets 28 are set back from the front end of the top frame 16 in order to permit a sufficient amount of the bag 40 to be folded back over the front end of the support structure 10 to retain the lip 44 of the bag 40 in folded back position during use of the receptacle by the house pet, as illustrated in FIG. 5.

The tray 60 is inserted through the opening in the bag 40 and lowered into the support structure 10. The bottom edges of the tray 60 will preferably contact the resilient sleeves 26 on the tray retaining members 22, which will roll slightly as the tray 60 is depressed down to the bottom frame 12 to be supported by the cross members 14. The sleeves 26 thus serve two functions. They enable the tray 60 to be properly positioned within the support structure 10 without stretching or tearing portions of the bag wall 42 which may be caught between the sides 66 or ends 64 of the tray 60 and the tray retaining members 22, and through resilient compressive forces they urge the bag wall 42 snugly against the sides 66 and ends 64 of the tray 60 to inhibit the spillage of litter 68 between the bag 40 and the exterior of the tray 60 during use by the housepet. The latter function enables trays 60 of slightly varying sizes to fit snugly within the tray retaining members 22, which provides advantages to the construction of a replacement kit 70 for the receptacle, as will be explained below.

Figure 6:
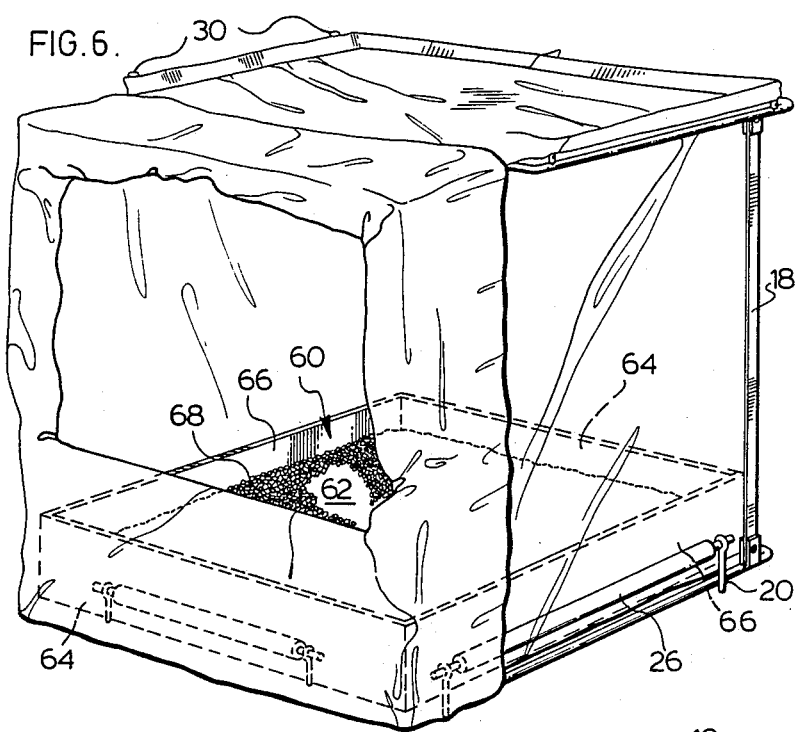
FIG. 6 is a perspective view of the embodiment illustrated in FIG. 5, including a tray shown partly in phantom lines.

The tray 60 is then filled with a suitable amount of absorbent litter 68 through the opening in the bag 40. The bag 40 is thus suspended from the securing means 30 of the top frame 16, holding the top 50 of the bag 40 generally taut, and the remainder of the bag wall 42 is held generally taut by the weight of the tray 60 containing litter 68, as illustrated in FIG. 6, creating a generally concealed privacy area for the pet.

The receptacle thus assembled is ready for use by the intended occupant. The pet enters and exits the resulting privacy area, which contains stray litter particles and odours, and conceals the litter 68 from view, through the opening in the bag 40. The bag may comprise an odor obsorbing material to enhance the containment odours. The horizontal member 32 supports the bag wall 42 above the front end of the tray 60 to inhibit the broadcast stray litter particles out of the opening of the bag 40 during use by the pet.

Figure 7:
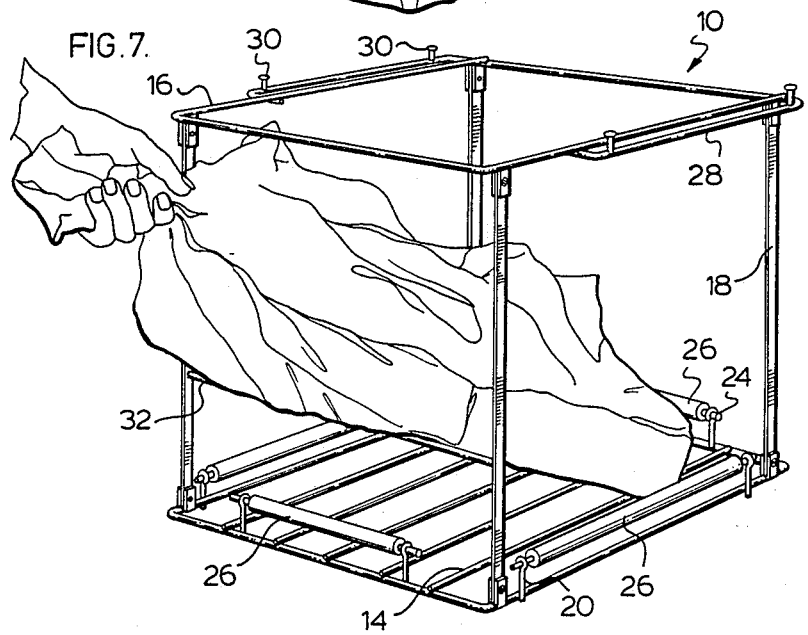
FIG. 7 is a perspective view illustrating a manner of removal of the receptacle illustrated in FIG. 6 for disposal.

When the litter 68 has become soiled, the householder simply unfolds the lip 44 of the bag from the top frame 16, supporting members 18 and bottom frame 12 at the front end of the support structure 10, removes or tears the flap portions 48 from the securing means 30 and withdraws the bag 40, together with the tray 60 and soiled litter 68, through the front or top of the support structure 10 for disposal, as illustrated in FIG. 7. Because the interior of the bag 40 is isolated from the flap portions 48 there is virtually no risk of tearing the bag wall 42 when the flap portions 48 are removed or torn from the securing means 30.

Figure 8:
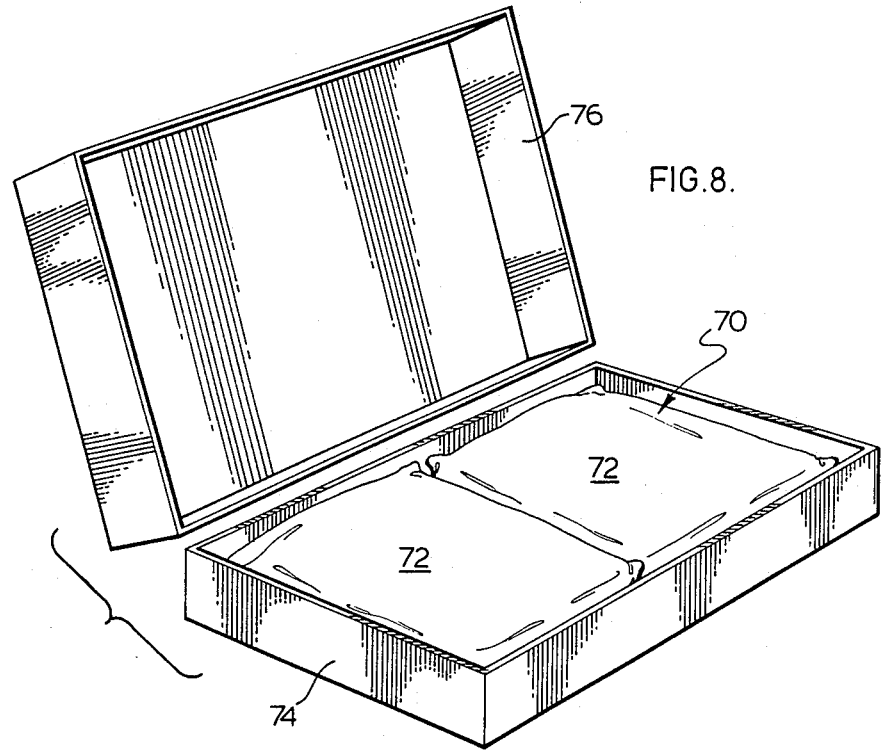
FIG. 8 is a perspective view of a replacement kit for the receptacle illustrated in FIG. 6.

A replacement kit 70 for the disposable receptacle illustrated in FIG. 8, preferably includes two flexible bags 40 as described herein (not shown) and two packages 72 containing a suitable amount of absorbant litter 68, which are packaged in a cardboard carton having a base 74 and a lid 76. Each of the base 74 and the lid 76 of the carton are preferably adapted to be used as a tray 60 within the supporting structure 10. The lid 76 of the carton must in general be slightly larger than the base 74, in order for the lid 76 to properly engage the base 74 to close the carton. The sleeves 26 of the tray retaining members 22, being resiliently compressible, permit each of the lid 76 and the base 74 of the carton to fit snugly within the tray retaining members 22 despite the slight difference in size between the two. There is thus virtually no wastage in the replacement kit 70 for the receptacle of the present invention, in that the carton packaging the replacement kit 70 forms part of the replacement kit 70 itself.

Having thus described a preferred embodiment of the invention by way of example only, it will be obvious to those skilled in the art that variations and modifications of the embodiment so described may be made without departing from the scope of the invention disclosed herein. The present invention includes all such variations and modifications as fall within the scope of the claims.

I claim:

1. A litter disposal system comprising a receptacle, including a flexible bag having an open end and an adjacent side wall with a pair of exterior opposed flap portions extending orthogonally to the open end, and a structure supporting means for securing the flap portions, wherein the bag is oriented such that the flap portions extend along a top of the supporting structure and are secured to the securing means with the open end of the bag adjacent to a side of the supporting structure.

2. A system as defined in claim 1 wherein the bag is composed of a plastic film.

3. A system as defined in claim 1 wherein the receptacle includes a tray.

4. A system as defined in claim 1 wherein the supporting structure includes a top frame having means for securing the flap portions, a bottom frame having tray retaining means and supporting members supporting the top frame in substantially vertically spaced relation to the bottom frame.

5. In a litter disposal system the combination of
   a support structure comprising a bottom frame including means for retaining a tray, a top frame including means for securing a bag, and supporting members defining sides of the support structure supporting the top frame in substantially vertically spaced relation to the bottom frame, and
   a receptacle comprising a flexible bag having an open end and a side wall with a pair of opposed exterior flap portions extending orthogonally to the open end for attachment to the securing means with the bag oriented such that the flap portions extend along the top of the supporting structure, to suspend the bag from the top frame of the support structure with the open end of the bag adjacent to a side of the support structure.

6. The combination as defined in claim 5, including a tray adapted to be retained by the tray retaining means.

7. The combination defined in claim 5 wherein the securing means protrude from opposed brackets depending from the top frame.

8. The combination claimed in claim 7 wherein the brackets are set back from a front end of the top frame.

9. The combination defined in claim 5 wherein the receptacle is disposable.

10. The combination defined in claim 5 wherein holes are provided in the flap portions for engaging the securing means.

* * * * *